United States Patent
Jang et al.

(10) Patent No.: US 6,239,584 B1
(45) Date of Patent: May 29, 2001

(54) TWO-INDUCTOR BOOST CONVERTER

(75) Inventors: Yungtaek Jang, Apex; Milan M. Jovanovic, Cary, both of NC (US)

(73) Assignee: Delta Electronics, Inc., Taipei (TW)

( * ) Notice: Subject to any disclaimer, the term of this patent is extended or adjusted under 35 U.S.C. 154(b) by 0 days.

(21) Appl. No.: 09/597,235

(22) Filed: Jun. 20, 2000

(51) Int. Cl.$^7$ .................................................. G05F 1/00
(52) U.S. Cl. ............................................................ 323/222
(58) Field of Search .................................... 323/222, 226, 323/273, 282, 285; 363/95, 97, 131

(56) References Cited

U.S. PATENT DOCUMENTS

| 5,729,444 | 3/1998 | Perot . | |
| 5,874,548 | * 12/1998 | He et al. | 323/222 |
| 5,956,243 | * 9/1999 | Mao | 363/61 |

OTHER PUBLICATIONS

M.T.Zhang et al., "Single–Phase Three–Level Boost Power Factor Correction Converter," IEEE Applied Power Electronics Conf. Proc., pp. 434–439, 1995.

E.X. Yang et al., "Isolated Boost Circuit for Power Correction," IEEE Applied Power Electronics Conf Proc., pp. 196–203, 1993.

G. Ivensky et al., "An Isolated Dc/Dc Converter Using Two Zero Current Switched IGBT'S In A Symmetrical Topology," IEEE Power Electronics Specialists' Conf. Rec., pp. 1218–1255, 1994.

W.C.P. de Aragao Filho et al., "A Comparison Between Two Current–Fed Push–Pull Dc–Dc Converters—Analysis, Design and Experimentation," IEEE International Telecommunication Energy Conf. Proc. Rec., pp. 313–320, 1996.

* cited by examiner

Primary Examiner—Matthew V. Nguyen
(74) Attorney, Agent, or Firm—Venable; Laurence J. Manhoefer

(57) ABSTRACT

A two-switch, two-inductor boost converter achieves output-voltage regulation in a wide input-voltage and load-current range using a constant-frequency by employing an auxiliary transformer to couple current paths of the two boost inductors so that both inductors carry the same current. By forcing the current through the boost inductors to be the same, the energy in both inductors is forced to change in unison, i.e., both inductors increase the energy when both switches are turned on simultaneously and decrease (transfer) energy when either of the converter's two switches is turned off. As a result, the stored and transferred energy of both inductors can be controlled in a wide input-voltage and load range using a constant-frequency control by controlling the time duration that the two switches are simultaneously on.

23 Claims, 17 Drawing Sheets

[T₀ - T₁]

[T₁ - T₂]

[T₂ - T₃]

[T₃ - T₄]

TWO-INDUCTOR BOOST CONVERTER

BACKGROUND OF THE INVENTION

1. Field of the Invention

This invention relates to the boost converter, and more particularly, to the two-inductor, two-switch boost converter.

2. Description of the Prior Art

The boost converter topology has been extensively used in various ac/dc and dc/dc applications. In fact, the front end of today's ac/dc power supplies with power-factor correction (PFC) is almost exclusively implemented with the boost topology. The boost topology is also used in numerous applications with a battery-powered input to generate a high output voltage from a relative low battery voltage.

Generally, the single-inductor, single-switch boost converter topology shown in FIG. 1 and its variations exhibit a satisfactory performance in the majority of applications. Nevertheless, in a number of high-power applications the performance of the boost converter can be improved by implementing the boost converter with multiple switches and/or multiple boost inductors. Multiple-switch and/or multiple-inductor boost topologies are usually employed in high-power applications with a high input voltage, or in applications where the conversion efficiency of a single-switch boost topology is significantly degraded by the reverse-recovery losses of the boost rectifier. In addition, isolated boost topologies require multiple-switch implementations and some of them may also be implemented with multiple boost inductors.

So far, a number of isolated and non-isolated multiple-switch and/or multiple-inductor topologies have been proposed, analyzed, and evaluated. For example, FIG. 2 shows the interleaved boost topology analyzed in [1]. This topology is often used in high-power PFC applications to eliminate reverse-recovery losses of the boost rectifier by operating the two boost converters at the boundary of the continuous-conduction mode (CCM) and discontinuous-conduction mode (DCM) so that the boost switches are turned on when the current through the corresponding boost rectifier is zero. Since in high-power applications the input current (boost-inductor current) ripple of a single DCM boost converter is very high, the switching instances of the two boost switches are interleaved, i.e., phase shifted for 180° degrees. With the interleaving, the input current ripple is reduced and, consequently, the size of the input filter (not shown in FIG. 2) is minimized. To achieve the operation at the CCM/DCM boundary under varying line and load-current conditions, the interleaved boost converter requires a variable switching frequency control, which is often perceived as a major drawback of the circuit. In addition, the implementation of the interleaved variable-frequency control is relatively complex.

Another multiple-switch boost converter implementation suitable for applications with high input voltage is shown in FIG. 3. The main feature of this so called "three-level" converter is that its semiconductors are subject to a voltage stress equal to a half of the output voltage. As a result, the converter can be implemented with semiconductors with a lower voltage rating, which reduces both conduction and switching losses and, consequently, improves the conversion efficiency. However, in applications with a wide input-voltage range, the boost converter in FIG. 3 requires a relatively complex control since different control strategies are required when the input voltage is below one-half of the output voltage compared to that when the input voltage is higher than one-half of the output voltage. In addition, the converter may not be able to maintain approximately equal voltage across the individual output filter caps if there is an asymmetry in the duty cycles of the two switches.

Two implementations of the isolated boost converter are shown in FIGS. 4 and 5. FIG. 4 shows the implementation with a single inductor [2], whereas FIG. 5 shows the implementation with two inductors [3], [4]. The main advantage of the two-inductor implementation is a simpler transformer design since the transformer primary has only a single winding, whereas the circuit in FIG. 4 requires two primary windings. In addition, the voltage stress of the switches in the two-inductor implementation in FIG. 5 is twice as low as the voltage stress on the switches in the single-inductor implementation in FIG. 4. Namely, the voltage stress on the primary switches in the circuit in FIG. 5 is equal to the reflected output voltage to the primary, whereas the corresponding stress in the circuit in FIG. 4 is twice the reflected output voltage. The major limitation of the two-inductor circuit is its inability to regulate the load in a wide range with a constant-frequency control.

SUMMARY OF THE INVENTION

In this invention, a two-switch, two-inductor boost converter that can achieve output-voltage regulation in a wide input-voltage and load-current range using a constant-frequency control is described. The converter's regulation range is extended by employing an auxiliary transformer to couple current paths of the two boost inductors so that both inductors carry the same current. By forcing the current through the boost inductors to be the same, the energy in both inductors is forced to change in unison, i.e., both inductors increase the energy when both switches are turned on simultaneously and decrease (transfer) energy when either of the two switches is turned off. As a result, the stored and transferred energy of both inductors can be controlled in a wide input-voltage and load range using a constant-frequency control by controlling the time duration that the two switches are simultaneously on.

The circuit of this invention can be implemented in a variety of ways. Specifically, the output stage of the circuit can be implemented either with a voltage-doubler rectifier, or a full-wave rectifier. Regardless of the type of the rectifier used, the circuit can be implemented with or without an isolation transformer, i.e., both non-isolated and isolated topologies of the circuit are possible. Finally, the circuit of this invention and its variations can also be implemented with a reduced number of components by integrating the auxiliary transformer and the boost inductors on a single magnetic piece.

DETAILED DESCRIPTION OF THE INVENTION

Figure 6:
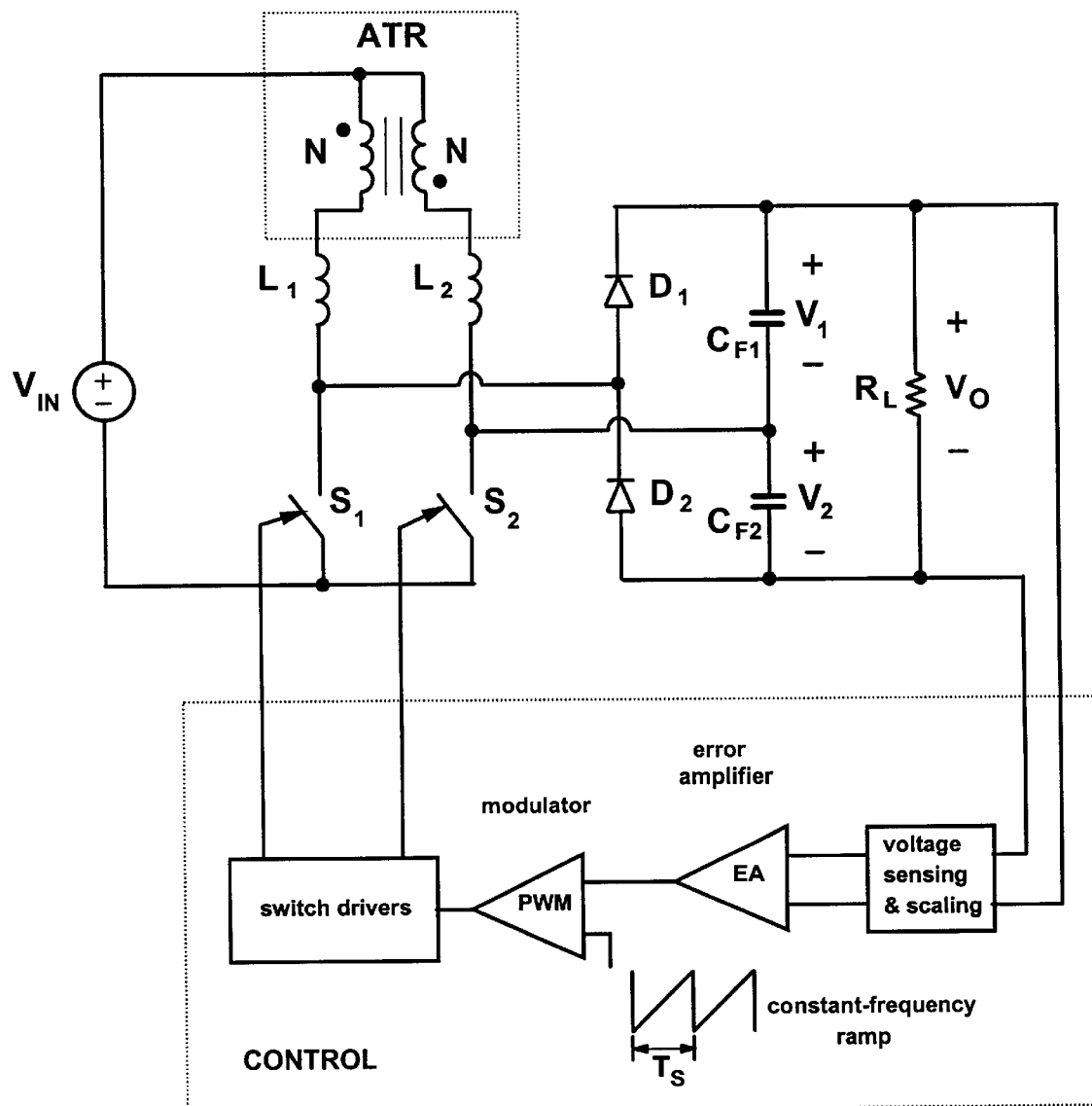
FIG. 6 shows boost converter of this invention.

The boost circuit of this invention is shown in FIG. 6. The input side of the circuit consists of two switches $S_1$ an $S_2$, two boost inductors $L_1$ and $L_2$, and auxiliary transformer ATR. The output side of the circuit, which is configured as a voltage doubler rectifier, consists of boost rectifiers $D_1$ and $D_2$ and output filter capacitors $C_{F1}$ and $C_{F2}$ connected across load $R_L$.

Figure 7:
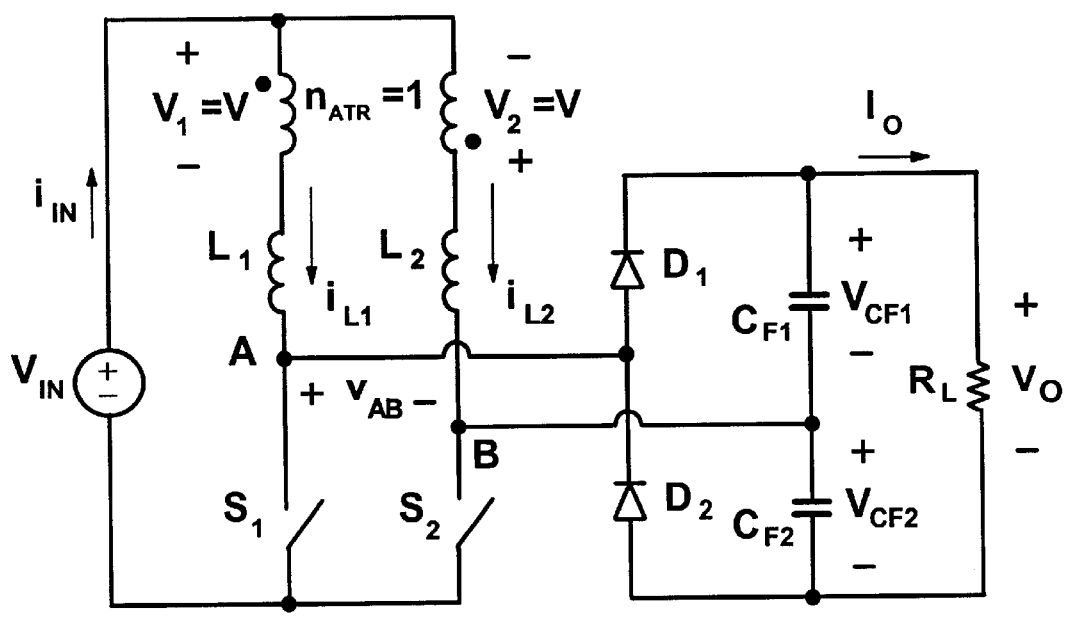
FIG. 7 is simplified model of circuit in FIG. 6 showing reference directions of currents and voltages.

To facilitate the explanation of the circuit operation, FIG. 7 shows a simplified circuit diagram of the circuit in FIG. 6. In the simplified circuit auxiliary transformer ATR is modeled as an ideal transformer with turns ratio $n_{ATR}=1$ by assuming that its magnetizing inductance is high so that it can be neglected. In addition, it is assumed that filter capacitors $C_{F1}$ and $C_{F2}$ are large enough so that the voltage ripple across them is small compared to their dc voltages. Finally, in this analysis it is also assumed that all semiconductor components are ideal, i.e., that they represent zero impedances in the on state and infinite impedances in the off state.

Figure 8A:
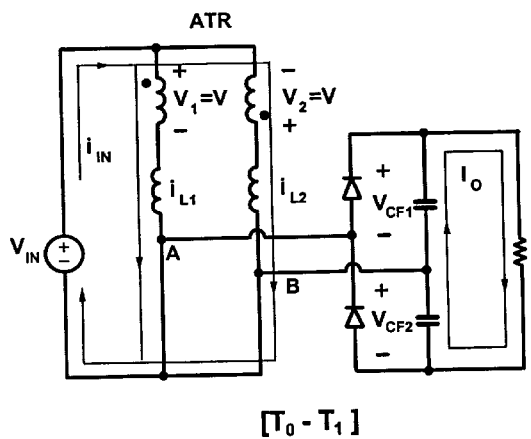
FIGS. 8(a)–(d) show topological stages of circuit in FIG. 6 during switching cycle.
Figure 8B:
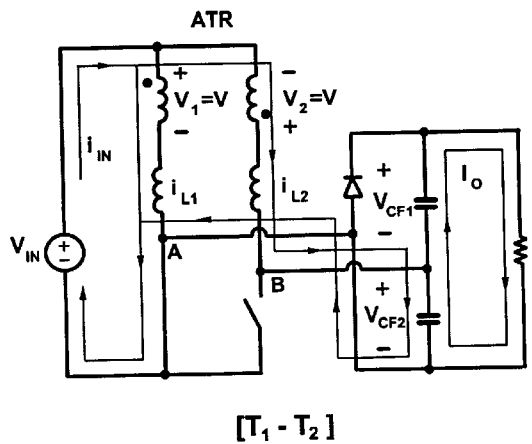
Figure 8C:
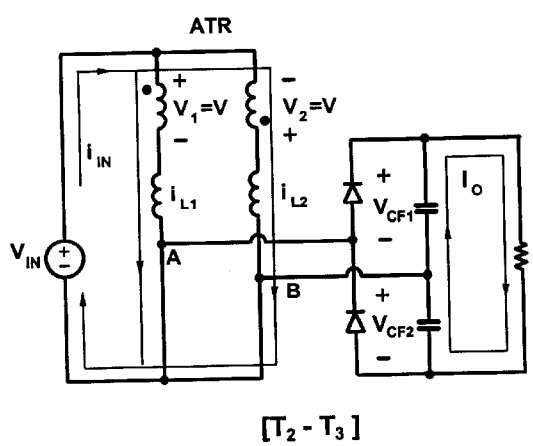
Figure 8D:
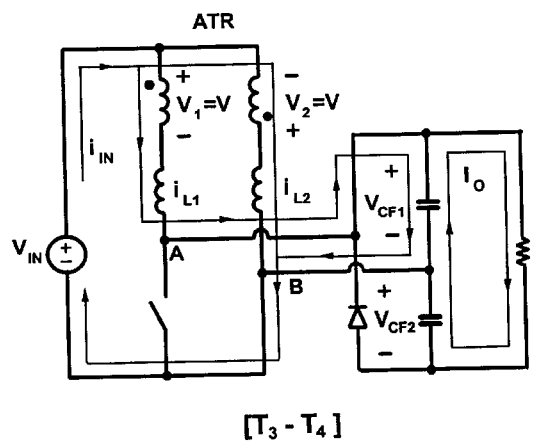
Figure 9:
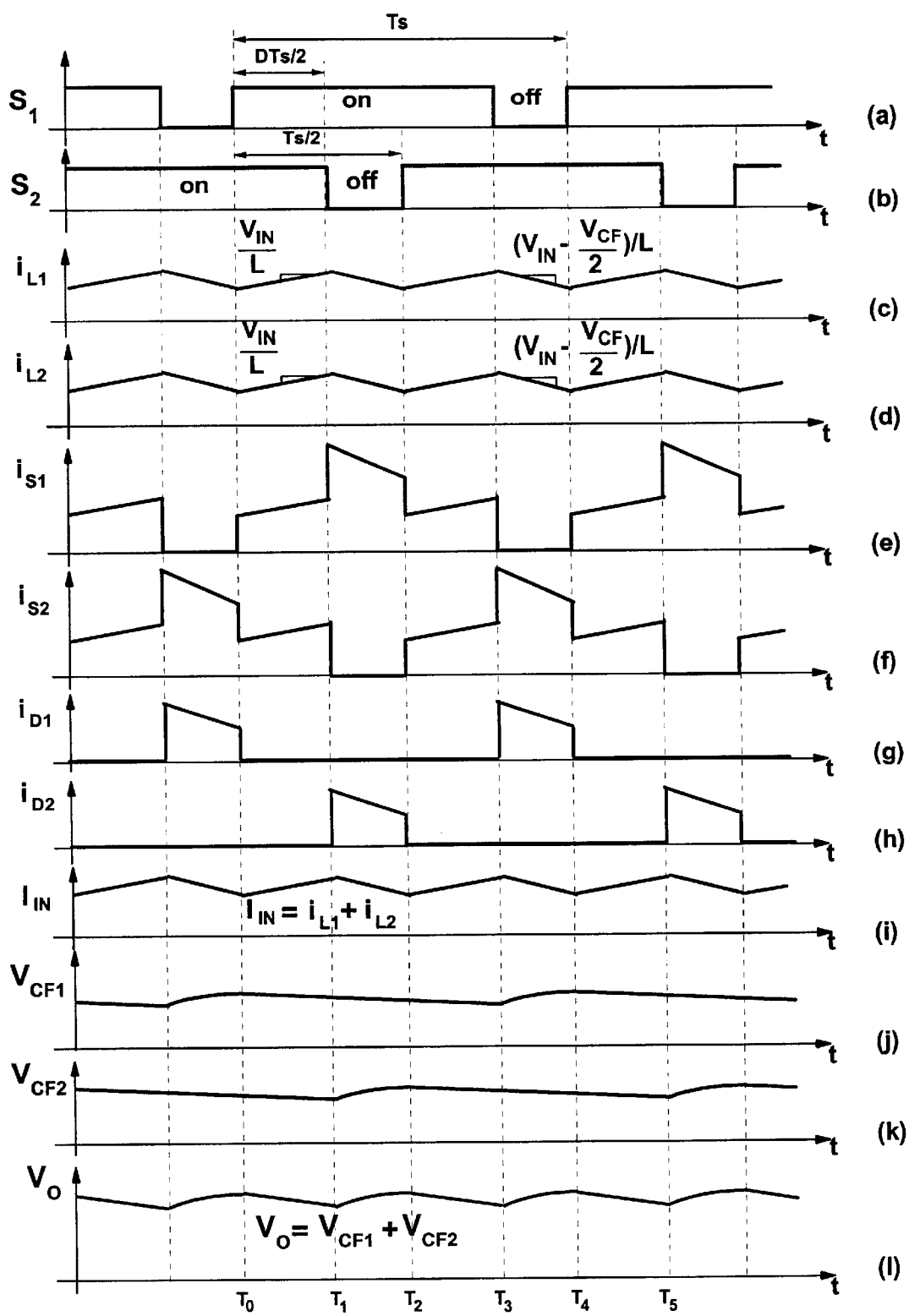
FIG. 9 shows key waveforms of circuit in FIG. 6 for $L_1=L_2=L$: (a) timing diagram of switch $S_1$; (b) timing diagram of switch $S_2$; (c) current $i_{L1}$ through boost inductor $L_1$; (d) current $i_{L2}$ through boost inductor $L_2$; (e) current $i_{S1}$ through switch $S_1$; (f) current $i_{S2}$ through switch $S_2$; (g) current $i_{D1}$ through rectifier $D_1$; (h) current $i_{D2}$ through rectifier $D_2$; (i) input current $I_{IN}$; (j) voltage $V_{CF1}$ across capacitor $C_{F1}$; (k) voltage $V_{CF2}$ across capacitor $C_{F2}$; (l) output voltage $V_O$.

To further facilitate the analysis of operation, FIG. 8 shows the topological stages of the circuit in FIG. 6 during a switching cycle, whereas FIG. 9 shows its key waveforms. The reference directions of currents and voltages plotted in FIG. 9 are shown in FIG. 7.

As can be seen from the timing diagrams of the control signals for switches $S_1$ and $S_2$ shown in FIGS. 9(a) and (b), respectively, in the circuit of this invention switches $S_1$ and $S_2$ conduct simultaneously because of the overlapping control signals. The time of the simultaneous conduction, defined from the turn-on moment of one switch until the turn-off instant of the other switch, represents duty cycle D of the converter, as indicated in FIG. 9.

From FIG. 7 it can be observed that because inductors $L_1$ and $L_2$ are connected in series with the corresponding transformer winding, inductor currents $i_{L1}$ and $i_{L2}$ must be equal at any given instant if turns ratio of the transformer is unity, i.e., if $n_{ATR}=1$. Therefore, during the time interval when both switches are on, i.e., during the time interval $T_0-T_1$ in FIG. 9, inductor currents $i_{L1}$ and $i_{L2}$ are increasing at the same rate, as shown in FIGS. 9(c) and (d). The rate of change of $i_{L1}$ and $i_{L2}$ can be calculated from FIG. 8(a), which represents the equivalent circuit diagram of the converter during the time interval $T_0-T_1$. Since according to FIG. 8(a)

$$V_{IN} = v_1 + L_1 \frac{di_{L1}}{dt} \tag{1}$$

and $$v_1 + L_1 \frac{di_{L1}}{dt} = -v_2 + L_2 \frac{di_{L2}}{dt}, \tag{2}$$

it follows that the same rate of change of $i_{L1}$ and $i_{L2}$, i.e., $di_{L1}/dt=di_{L2}/dt$, can only be satisfied if $$v = \frac{L_1 - L_2}{L_1 + L_2} V_{IN}, \tag{3}$$

where $v=v_1=v_2$ because $n_{ATR}=1$. Therefore, from Eqs. (1) and (2)

$$\frac{di_{L1}}{dt} = \frac{di_{L2}}{dt} = \frac{V_{IN} - v}{L_1} = \frac{V_{IN} + v}{L_2}. \tag{4}$$

If both inductances have the same value $L=L_1=L_2$, it follows that $v=0$ and $$\frac{di_{L1}}{dt} = \frac{di_{L2}}{dt} = \frac{V_{IN}}{L}, \tag{5}$$

as indicated in FIGS. 9(c) and (d).

Since when both switches are on rectifiers $D_1$ and $D_2$ are reverse biased, the output side is decoupled from the input side. As a result, during this stage the load current is supplied from the filter capacitors and capacitor voltages $V_{CF1}$ and $V_{CF2}$ slowly decrease, as seen from waveforms in FIGS. 9(j) and (k). Since output voltage $V_O=V_{CF1}+V_{CF2}$, the output voltage also slowly decreases.

When at $t=T_1$ switch $S_2$ is turned off, inductor current $i_{L2}$ is diverted from the switch to rectifier $D_2$, as shown in FIG. 8(b), and the energy stored in inductor $L_2$ starts to discharge into filter capacitor $C_{F2}$. Since during this stage current $i_{L2}$ decreases, current $i_{L1}$ has to decrease at the same rate because the currents in the windings of the transformer are always equal. The rate of the current decrease can be found by observing that in the equivalent circuit in FIG. 8(b)

$$V_{IN} = v_1 + L_1 \frac{di_{L1}}{dt} = v + L_1 \frac{di_{L1}}{dt} \tag{6}$$

and $$V_{AB} = -V_{CF2} = -L_1 \frac{di_{L1}}{dt} - v_1 - v_2 + L_2 \frac{di_{L2}}{dt} = -2v. \quad (7)$$

From Eqs. (6) and (7), assuming $L=L_1=L_2$, follow that $$v = \frac{V_{CF2}}{2} = \frac{V_{CF}}{2} \quad (8)$$

and $$\frac{di_{L1}}{dt} = \frac{di_{L2}}{dt} = \frac{1}{L}\left(V_{IN} - \frac{V_{CF2}}{2}\right) = \frac{1}{L}\left(V_{IN} - \frac{V_{CF}}{2}\right), \quad (9)$$

where $V_{CF}=V_{CF1}=V_{CF2}$.

Because during the topological stage shown in FIG. 8(*b*), current $i_{L2}$ charges capacitor $C_{F2}$, capacitor voltage $V_{CF2}$ increases. At the same time, voltage $V_{CF1}$ across capacitor $C_{F1}$ continues to decrease because this capacitor continues to be discharged by the load current, as shown in FIGS. 9(*j*) and (*k*).

When at $t=T_2$ switch $S_2$ is turned on again, the circuit enters the topological stage shown in FIG. 8(*c*), which is identical to the topological stage in FIG. 8(*a*). During this stage both switches are on and both inductor currents $i_{L1}$ and $i_{L2}$ increase at the same rate given by Eq. (5). At the same time, both output filter capacitors are being discharge by the load current since rectifiers $D_1$ and $D_2$ are reverse biased and the output part of the circuit is decoupled from the input part.

The converter enters the final topological stage shown in FIG. 8(*d*) at $t=T_3$ when switch $S_1$ is turned off and current $i_{L1}$ is commutated from the switch into rectifier $D_1$. During this stage, energy stored in inductors $L_1$ and $L_2$ during the preceding topological stage discharges into capacitor $C_{F1}$. The rate of decrease of currents $i_{L1}$ and $i_{L2}$ is given by Eq. (9). Due to the flow of current $i_{L1}$ into capacitor $C_{F1}$, voltage $V_{CF1}$ increases, whereas voltage $V_{CF2}$ continues to decrease because capacitor $C_{F2}$ continues to be discharge by the load current. The circuit enter a new switching cycle at $t=T_4$ when switch $S_1$ is turned on again.

The voltage conversion ratio of the circuit can be calculated from the volt-second balance on the boost inductors. From FIGS. 8 and 9, the volt-second balance equation for $L_1$ is $$V_{IN}D\frac{T_S}{2} = \left(\frac{V_{CF}}{2} - V_{IN}\right)\cdot\left(\frac{T_S}{2} - D\frac{T_S}{2}\right) \quad (10)$$

so that $$\frac{V_O}{V_{IN}} = \frac{4}{1-D} \quad (11)$$

since $V_O=2V_{CF}$.

As can be seen from Eq. (11), the output voltage of the converter in FIG. 6 is at least four times larger than the input voltage. This high conversion ratio makes the converter the best suitable for applications with a high difference between the output and input voltage. It also should be note that because of the converter's unique property to simultaneously charge and discharge both boost inductors due to the coupling of inductor currents through the auxiliary transformer, the converter can maintain the regulation of the output voltage with a constant frequency control in a wide range of the load current. Namely, with the duty cycle close to unity, the maximum power is transferred from the input to the output since the maximum energy is stored in the inductors. As the duty cycle decreases toward zero, less and less energy is stored in both inductors, which enables the output voltage regulation down to very light loads. Finally, it should be noted that if $L_1=L_2=L$ and $n_{ATR}=1$, both inductors in FIG. 6 store and transfer the same amount of energy, i.e., each leg of the converter processes one-half of the total power. Since the total power is processed in two parallel legs, the conduction loss of the circuit is reduced compared to a circuit with a single power path.

Figure 1:
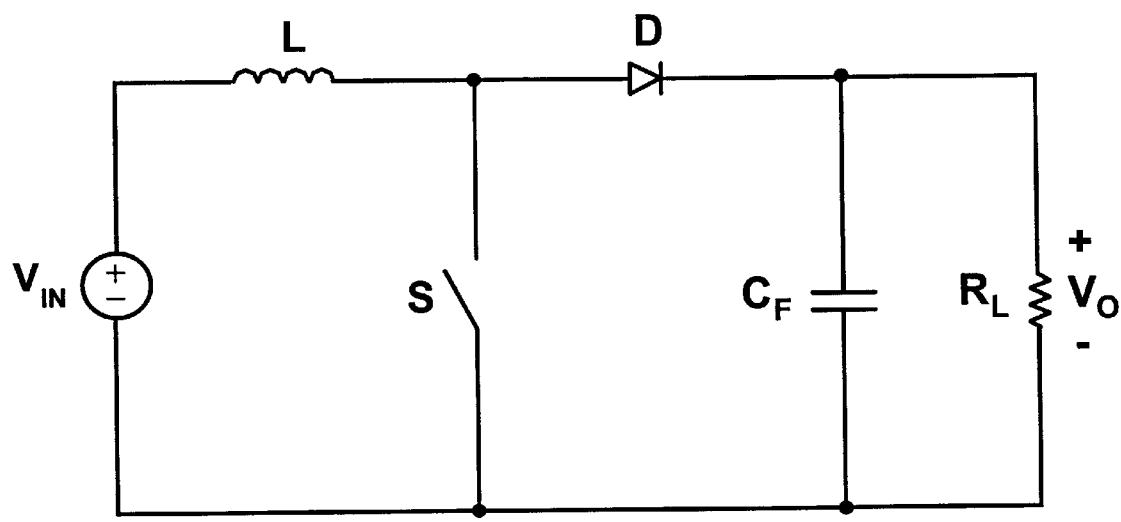
FIG. 1 shows boost converter topology (prior art).
Figure 2:
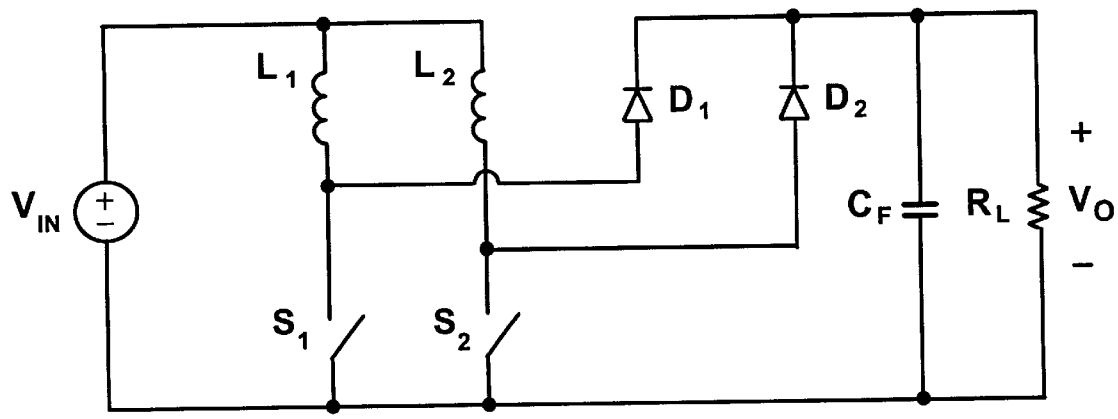
FIG. 2 shows two interleaved boost converters [1] (prior art)
Figure 3:
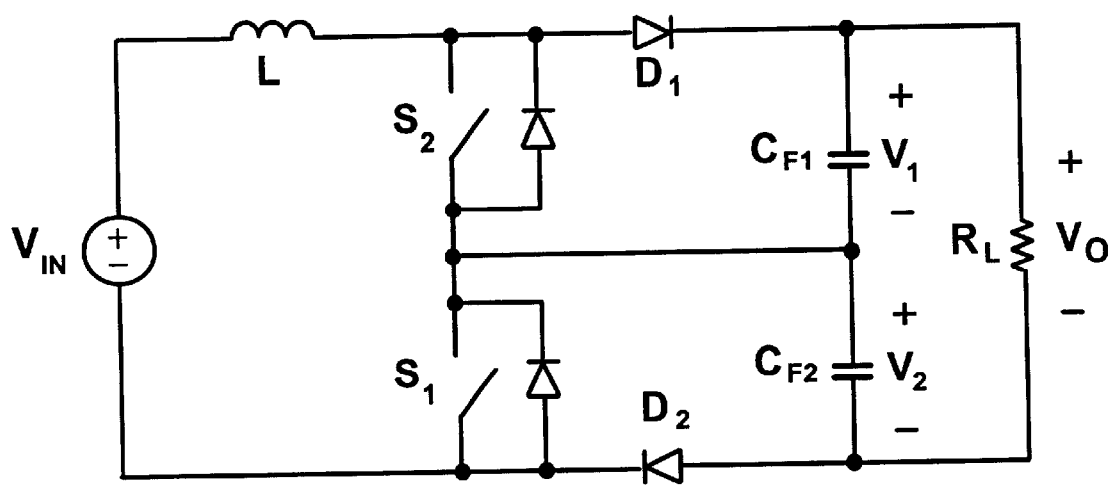
FIG. 3 shows three-level boost converter [1] (prior art).
Figure 4:
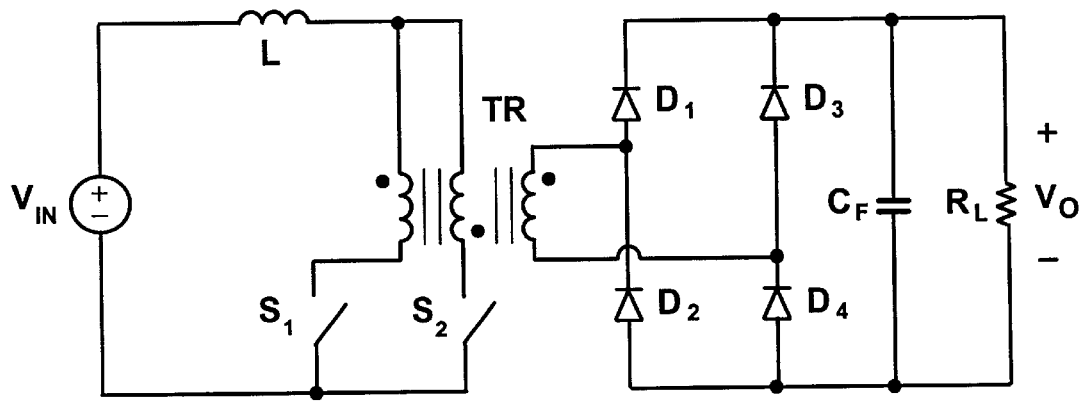
FIG. 4 is isolated two-switch boost converter [4] (prior art).
Figure 5:
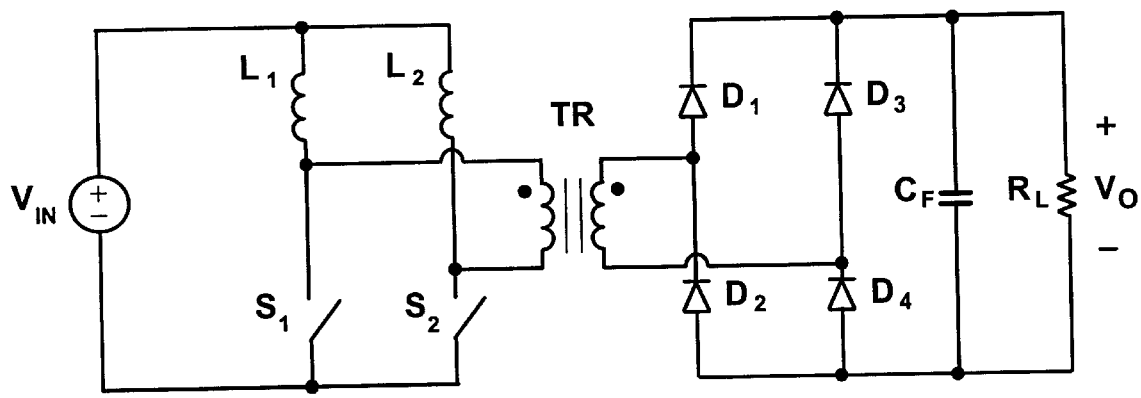
FIG. 5 is isolated half-bridge boost converter [2], [3] (prior art).
Figure 10:
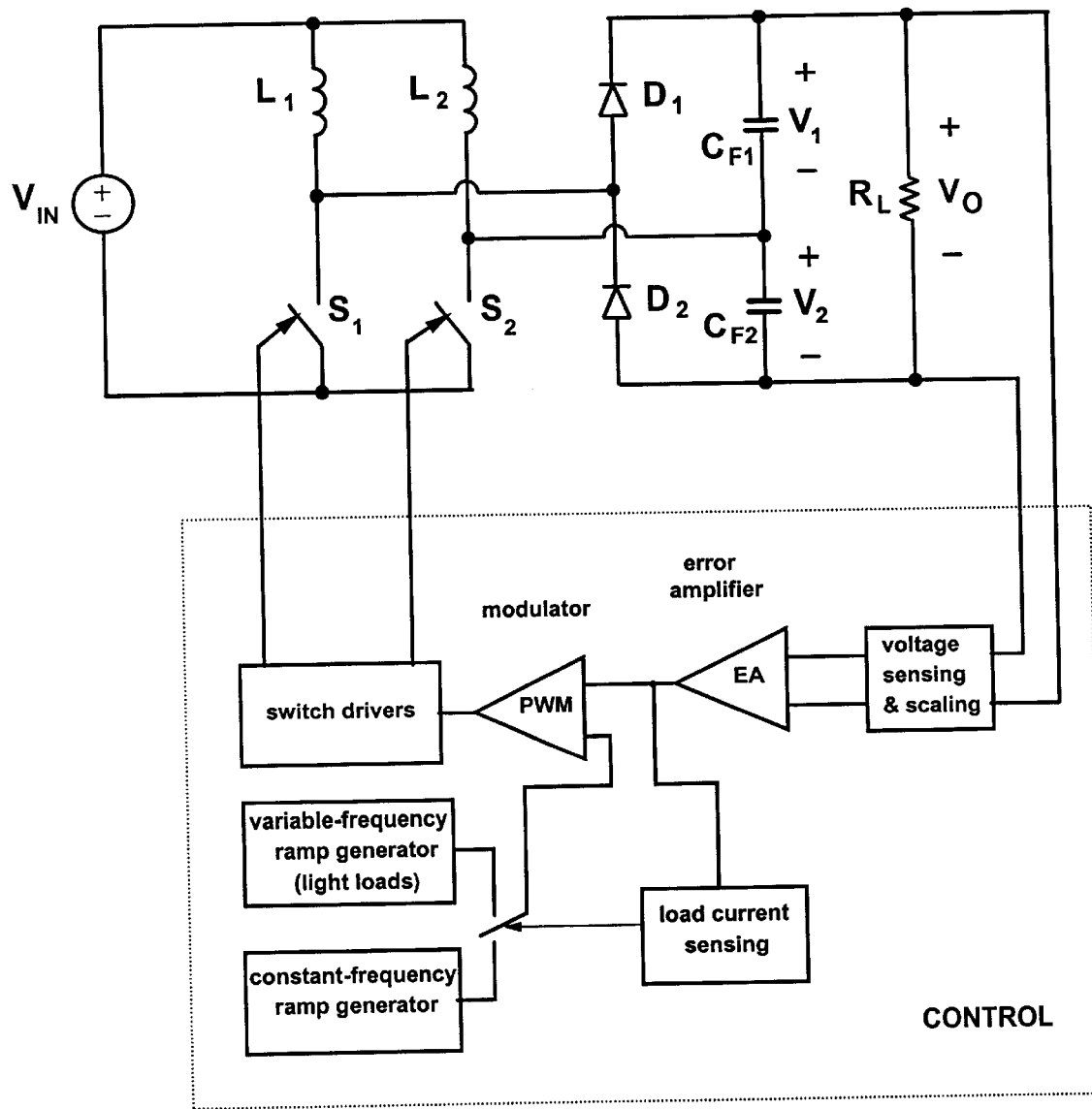
FIG. 10 is implementation of circuit in FIG. 6 without auxiliary transformer.
Figure 11:
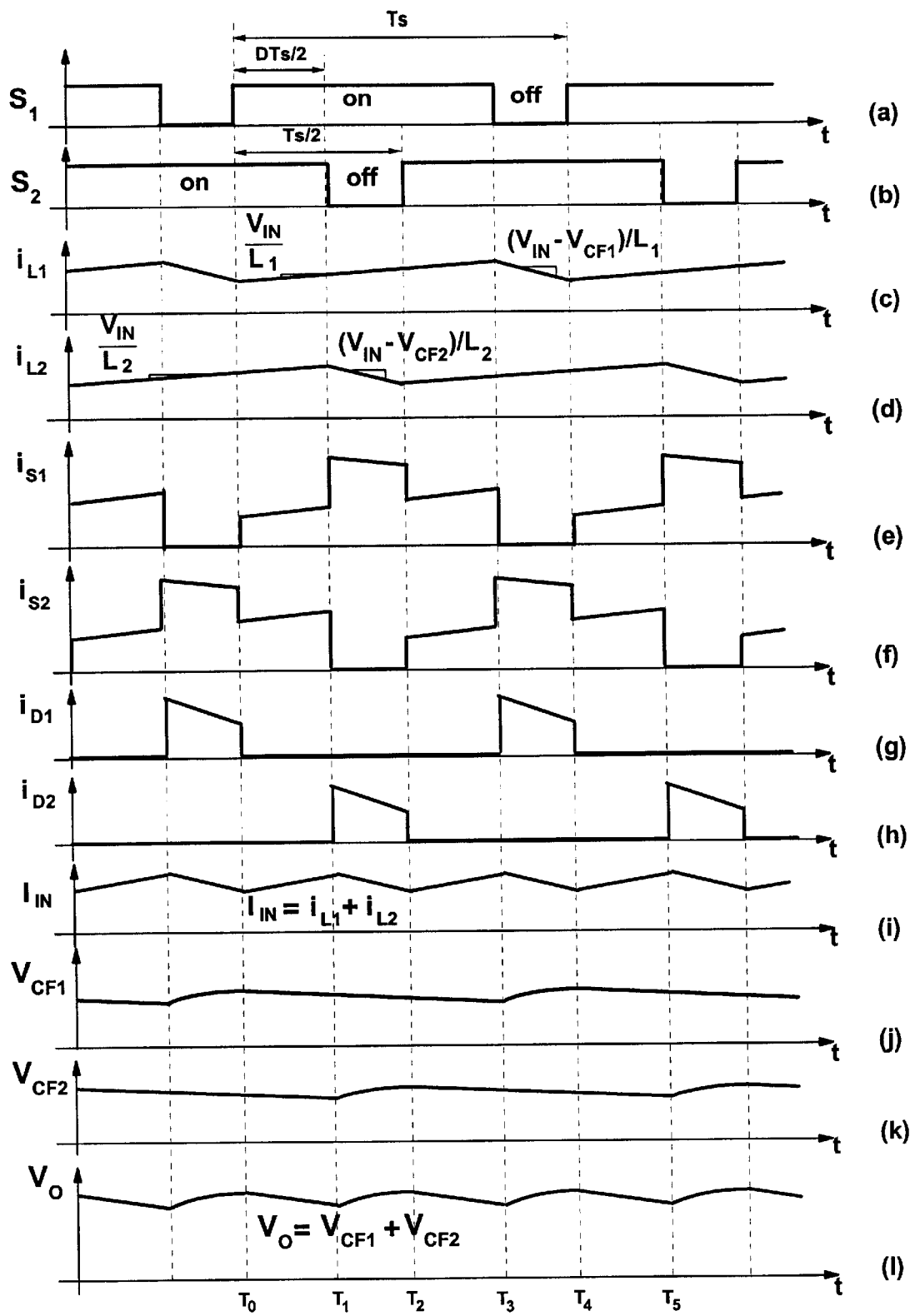
FIG. 11 shows key waveforms of implementation in FIG. 10: (a) timing diagram of switch $S_1$; (b) timing diagram of switch $S_2$; (c) current $i_{L1}$ through boost inductor $L_1$; (d) current $i_{L2}$ through boost inductor $L_2$; (e) current $i_{S1}$ through switch $S_1$; (f) current $i_{S2}$ through switch $S_2$; (g) current $i_{D1}$ through rectifier $D_1$; (h) current $i_{D2}$ through rectifier $D_2$; (i) input current $I_{IN}$; (j) voltage $V_{CF1}$ across capacitor $C_{F1}$; (k) voltage $V_{CF2}$ across capacitor $C_{F2}$; (l) output voltage $V_O$.

It should be noted that the circuit in FIG. 6 can also work without auxiliary transformer ATR. However, in this implementation, which is shown in FIG. 10, the regulation of the output voltage cannot be maintained in a wide load range employing a constant-frequency control. To explain this limitation of the circuit in FIG. 10, FIG. 11 shows its key waveforms. As can be seen from FIGS. 11(*c*) and (*d*), because of the absence of the coupling between currents flowing in inductors $L_1$ and $L_2$, currents $I_{L1}$ and $i_{L2}$ are not the same. Namely, current $i_{L1}$ increases during the entire time switch $S_1$ is on and decreases during the entire off time of switch $S_1$. Similarly, current $i_{L2}$ increases during the on time of switch $S_2$ and decreases during its off time. As a result, even when duty cycle D of converter in FIG. 10 is reduced to zero, the energy is still stored in the inductors because switches $S_1$ and $S_2$ are on for a half of switching period $T_S$. To reduce the stored energy and extend the load regulation range, it is necessary to shorten the conduction time of the switches. This can be accomplished by increasing the switching frequency. Therefore, the circuit in FIG. 10 requires a variable-frequency control to maintain output regulation in a wide load range. It also should be noted that because of the absence of the auxiliary transformer, the voltage conversion ratio of the circuit in FIG. 10 is only one-half of the conversion ratio of the circuit in FIG. 5, given in Eq.(11).

Figure 12:
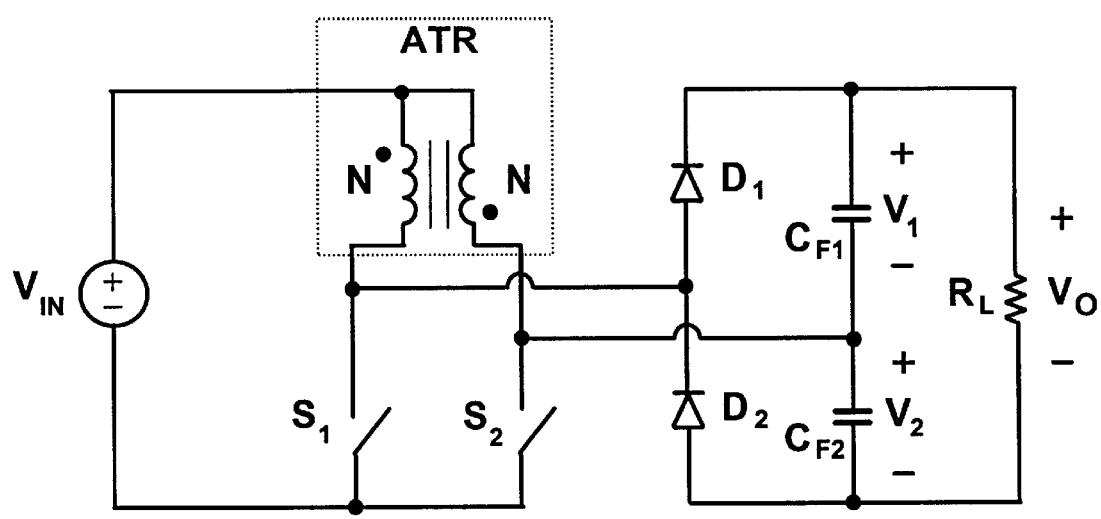
FIG. 12 is implementation of circuit in FIG. 6 integrated magnetics, which utilizes leakage inductance of transformer as boost inductors.

The circuit of this invention can also be implemented with a single magnetic component, as shown in FIG. 12. In this integrated magnetics implementation, the auxiliary transformer and the boost inductors can be integrated in a variety of ways. For example, the integration can be achieved by adjusting the coupling between the transformer windings so that the leakage inductance of the transformer windings is used as the boost inductances. To avoid a degradation of the transformer efficiency and to minimize electromagnetic field radiation, a magnetic-shunt approach should be used to achieve the desired coupling.

Figure 13:
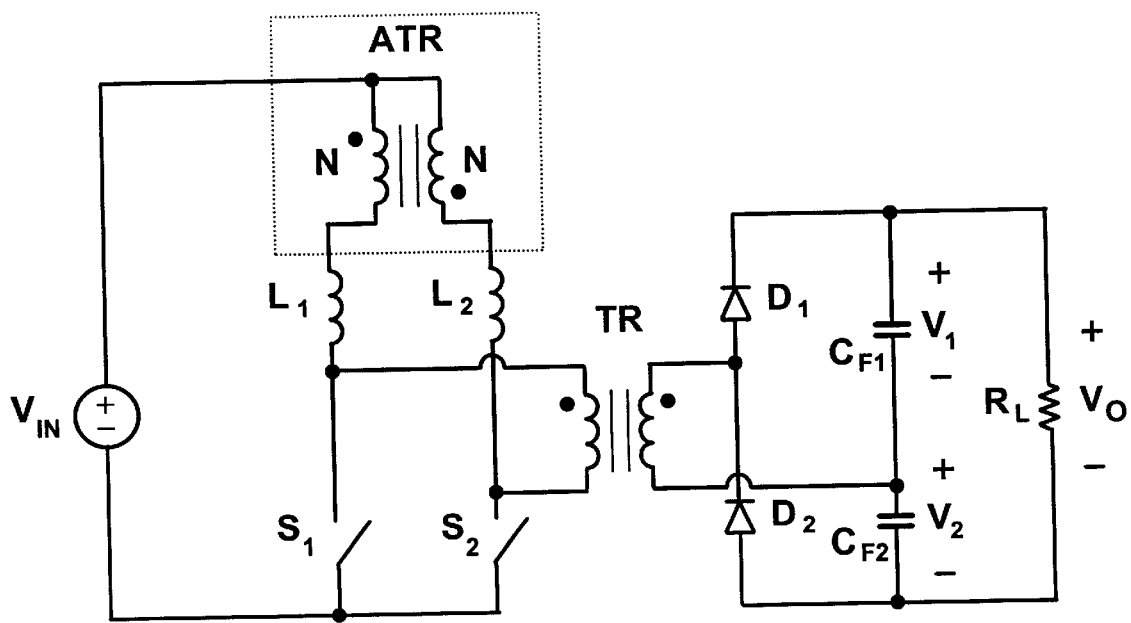
FIG. 13 is isolated version of circuit of this invention shown in FIG. 6.
Figure 14:
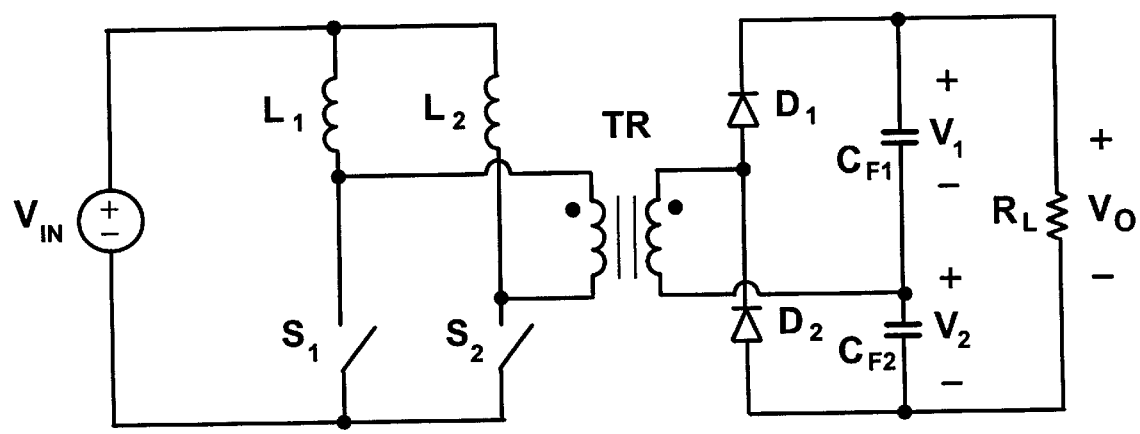
FIG. 14 is isolated version of implementation in FIG. 10.
Figure 15:
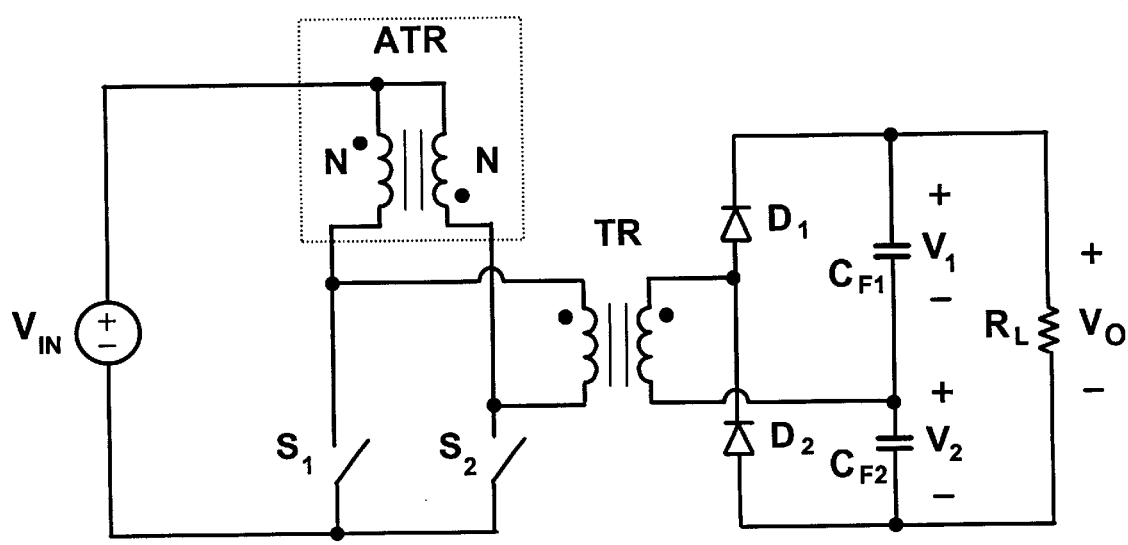
FIG. 15 is isolated version of implementation in FIG. 12.

The non-isolated circuits in FIGS. 6, 10, and 12 can also be implemented with an isolation transformer, as shown in FIGS. 13, 14, and 15, respectively. The operation of these isolated circuits, as well as their properties are the same as those of their corresponding non-isolated counterparts.

Figure 16A:
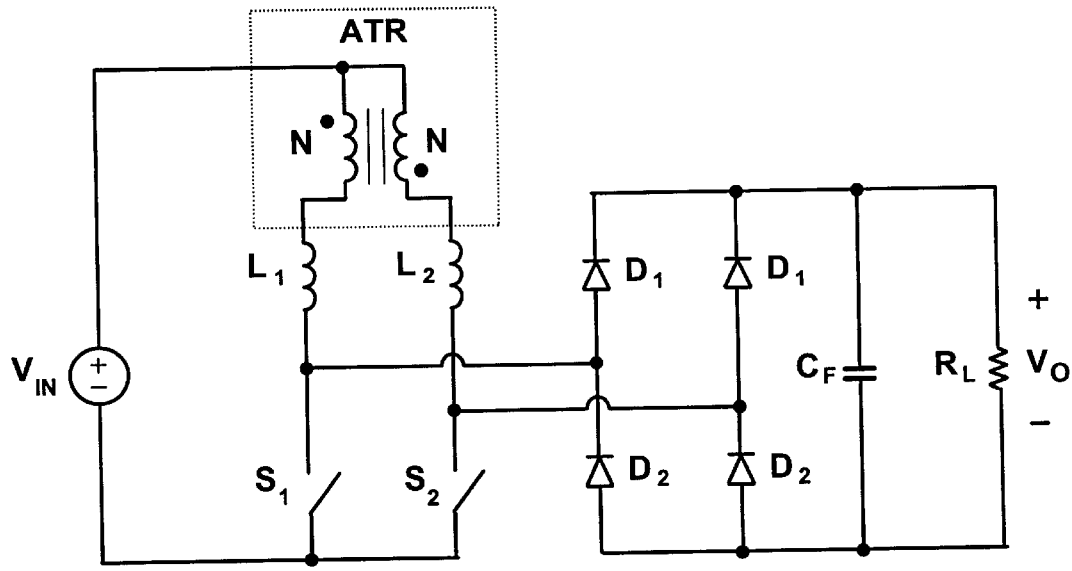
FIGS. 16(a)–(b) show implementation of circuit in FIG. 6 with full-wave rectifier: (a) non-isolated version; (b) isolated version.
Figure 16B:
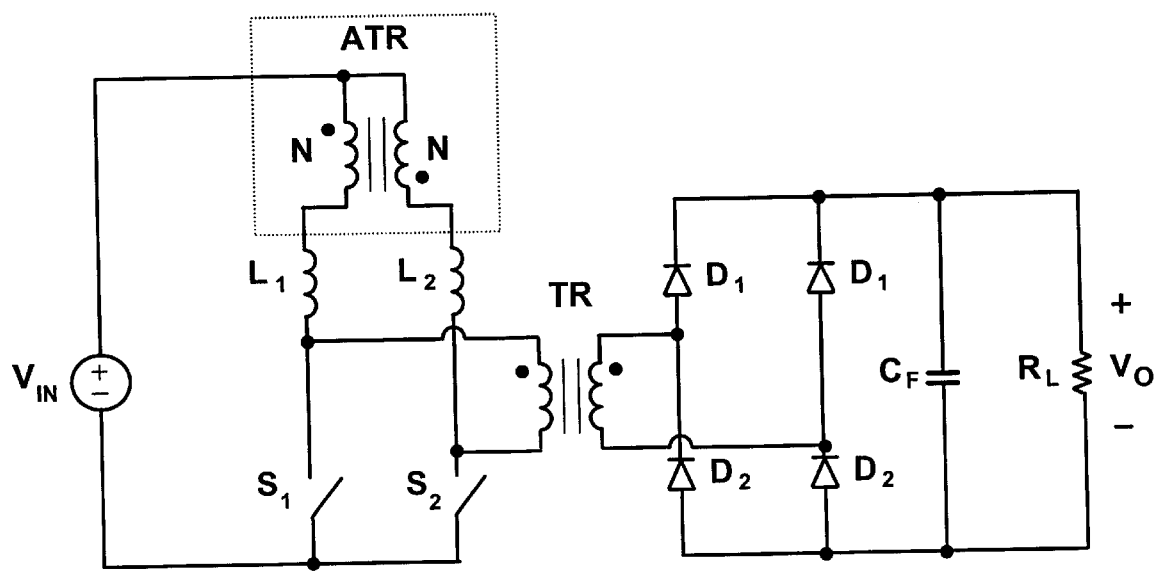

The circuit in FIGS. 6, 10, 12–15, can also be implemented with a full-wave rectifier instead of the voltage-doubler rectifier. As an example, FIGS. 16(*a*) and (*b*) show the non-isolated and isolated implementations of the converter in FIG. 6 with a full-bridge rectifier, respectively.

Figure 17:
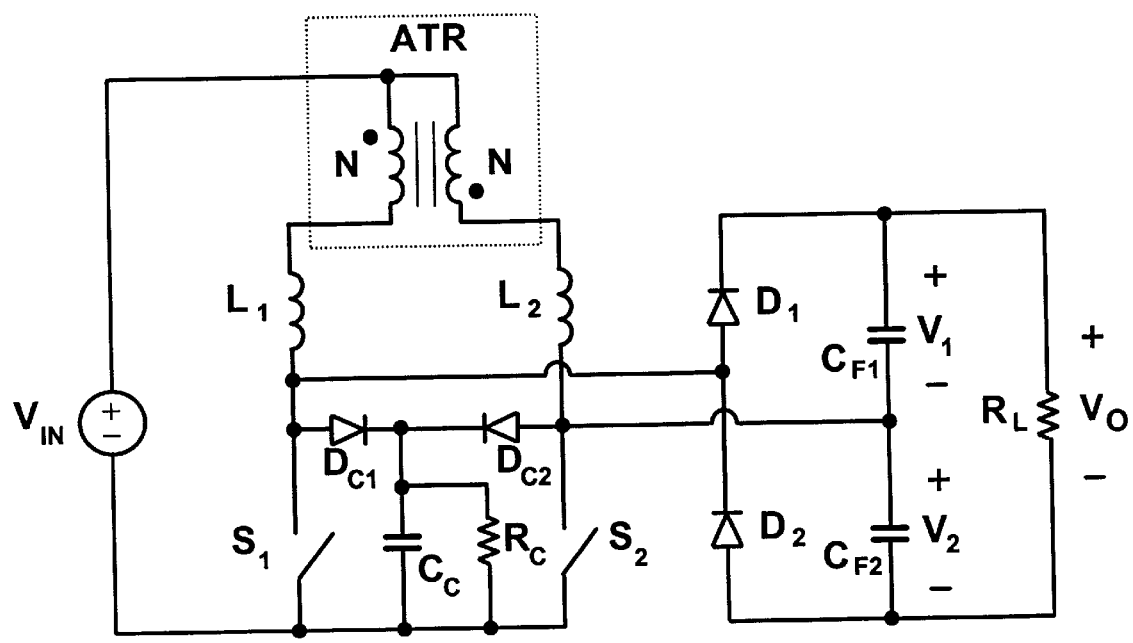
FIG. 17 shows clamp circuit that protects boost switches from over-voltage in case of accidental turn-off both switches due to control circuit failure.

Finally, it should be noted that in all circuit implementations discussed in this invention an accidental simultaneous opening of both switches would lead to a catastrophic circuit failure since the energy stored in the boost inductors would not have a path to discharge. Therefore, to prevent the circuit failure, it is necessary to provide a discharging path for the energy of the boost inductors when both switches are open. As an example, FIG. 17 shows a protection circuit implemented with a RCD snubber connected across the switches. It should be noted that many other implementations of the protection circuit are possible.

To verify the performance of the circuit of this invention, a 1.2 kW prototype boost converter that operates from a 40–70-V battery input and delivers 2.9 A at a 376-V output was evaluated. The measured efficiencies of the prototype circuit at the low line ($V_{IN}$=40 V) and the high line ($V_{IN}$=70 V) in the full range of load current ($I_O$=0.1–2.9 A) are summarized in Table I. The output voltage of the prototype circuit was regulated using a constant-frequency (40 kHz) control in the entire load range.

TABLE I

Measured efficiency of experimental 1.2 kW boost converter.

| Output Current [A] | Efficiency [%] @ Vin = 40 Vdc | Efficiency [%] @ Vin = 70 Vdc |
| --- | --- | --- |
| 0.1 | 93.4 | 82.1 |
| 0.3 | 89.8 | 96.0 |
| 0.5 | 91.7 | 93.3 |
| 0.7 | 91.7 | 92.0 |
| 0.9 | 92.0 | 93.0 |
| 1.1 | 92.6 | 93.6 |
| 1.3 | 92.9 | 94.0 |
| 1.5 | 93.1 | 94.0 |
| 1.7 | 93.0 | 94.3 |
| 1.9 | 93.2 | 94.6 |
| 2.1 | 93.3 | 95.2 |
| 2.3 | 93.2 | 95.5 |
| 2.5 | 92.9 | 95.3 |
| 2.7 | 92.7 | 95.4 |
| 2.9 | 92.0 | 95.5 |

References

1. M. T. Zhang, et. al., "Single-Phase Three-Level Boost Power Factor Correction Converter," *IEEE Applied Power Electronics Conf. (APEC) Proc.*, pp. 434–439, 1995.

2. E. X. Yang, Y. M. Jiang, G. C. Hua, F. C. Lee, "Isolated Boost Circuit for Power Correction," *IEEE Applied Power Electronics Conf (APEC) Proc.*, pp. 196–203, 1993.

3. G. Ivensky, I. Elkin, S. Ben-Yakov, "An Isolated Dc/Dc Converter Using Two Zero Current Switched IGBT's in a Symmetrical Topology," *IEEE Power Electronics Specialists' Conf. Rec.*, pp. 1218–1225, 1994.

4. W. C. P. de Aragao Filho, I. Barbi, "A Comparison Between Two Current-Fed Push-Pull Dc-Dc Converters—Analysis, Design and Experimentation," *IEEE International Telecommunication Energy Conf. Proc. Rec.*, pp. 313–320, 1996.

We claim:

1. A boost power converter driving a load comprising in combination:

a voltage source having a first and a second terminal;

a series connection of a first boost inductor and a first boost switch, said first boost switch connected to said first terminal of said voltage source;

a series connection of a second boost inductor and a second boost switch, said second boost switch connected to said first terminal of said voltage source;

an auxiliary transformer having a primary and a secondary winding, said primary winding connected between said second terminal of said voltage source and said first boost inductor of said series connection of said first boost inductor and said first boost switch, said secondary winding connected between said secondary terminal of said voltage source and said second boost inductor of said series connection of said second boost inductor and said second boost switch, said auxiliary transformer coupling the current path of said first boost inductor with the current path of said second boost inductor so that the energy in said first boost inductor and said second boost inductor increases and decreases simultaneously as said first and second boost switches are periodically open and periodically closed;

a power output circuit including diodes and capacitors coupling the common node of said series connection of said first switch and said first boost inductor and the common node of said series connection of said second switch and said second boost inductor to said load;

a control circuit, responsive to variations of said load and said voltage source, controlling the duration of on and off states respectively of said first and second boost switches to maintain the voltage across said load within predetermined range of values.

2. A boost power converter as in claim 1 wherein said control circuit operates to turn on and turn off said first and second boost switches at a constant frequency and a variable duty cycle to maintain said load voltage within said predetermined range for a wide input voltage range and a wide load current range by controlling the time duration that said first and second boost switches are simultaneously on.

3. A boost power converter as in claim 1 wherein said auxiliary transformer has a 1:1 turns ratio.

4. A boost power converter as in claim 2 wherein said auxiliary transformer has a 1:1 turns ratio.

5. A boost power converter as in claim 1 wherein said power output circuit is a voltage doubler rectifier.

6. A boost power converter as in claim 2 wherein said power output circuit is a voltage doubler rectifier.

7. A boost power converter as in claim 4 wherein said power output circuit is a voltage doubler rectifier.

8. A boost power converter as in claim 1 wherein said power output circuit is a full-wave rectifier.

9. A boost power converter as in claim 2 wherein said power output circuit is a full-wave rectifier.

10. A boost power converter as in claim 4 wherein said power output circuit is a full-wave rectifier.

11. A boost power converter as in claim 1 wherein said power output circuit includes an isolation transformer providing isolation between said voltage source and said load.

12. A boost power converter as in claim 2 wherein said power output circuit includes an isolation transformer providing isolation between said voltage source and said load.

13. A boost power converter as in claim 7 wherein said power output circuit includes an isolation transformer providing isolation between said voltage source and said load.

14. A boost power converter as in claim 10 wherein said power output circuit includes an isolation transformer providing isolation between said voltage source and said load.

15. A boost power converter as in claim 1 wherein said first and second boost inductors and said transformer have a common magnetic core.

16. A boost power converter as in claim 1 wherein said voltage source is a direct current source.

17. A boost power converter as in claim I wherein said voltage source is a rectified alternating current source.

18. A boost power converter as in claim 1 further comprising an energy storage circuit including diodes capacitors, and resistors coupled across said first boost and second boost switches providing an energy discharging path for said first and second boost inductors when both switches are simultaneously turned off.

19. A boost power converter driving a load comprising in combination:
- a voltage source having a first and a second terminal;
- a series connection of a first boost inductor and a first boost switch, said first boost switch connected to said first terminal of said voltage source, and said first inductor connected to said second terminal of said voltage source;
- a series connection of a second boost inductor and a second boost switch, said second boost switch connected to said first terminal of said voltage source, and said second boost inductor connected to said second terminal of said voltage source;
- a power output circuit including diodes and capacitors coupling the common node of said series connection of said first switch and said first boost inductor and the common node of said series connection of said second switch and said second boost inductor to said load;
- a control circuit, responsive to variations of said load and said voltage source, controlling the duration of on and off states (respectively) of said first and second boost switches to maintain the voltage across said load within predetermined range of values.

20. A boost power converter as in claim 19 wherein at higher load currents said control circuit turns on and turns off said first and second boost switches at a constant frequency and a variable duty cycle to maintain said load voltage within said predetermined range by controlling the time duration that said first and second boost switches are simultaneously on, and wherein at lighter load currents said control circuit turns on and turns off said first and second boost switches at a variable frequency to maintain said load voltage within said predetermined range.

21. A boost power converter as in claim 20 wherein said power output circuit is a voltage doubler rectifier.

22. A boost power converter as in claim 20 wherein said power output circuit includes an isolation transformer providing isolation said voltage source and said load.

23. A boost power converter as in claim 20 further comprising an energy storage circuit including diodes capacitors, and resistors coupled across said first boost and second boost switches providing an energy discharging path for said first and second boost inductors when both switches are simultaneously turned off.

\* \* \* \* \*